United States Patent Office 3,021,627
Patented Feb. 20, 1962

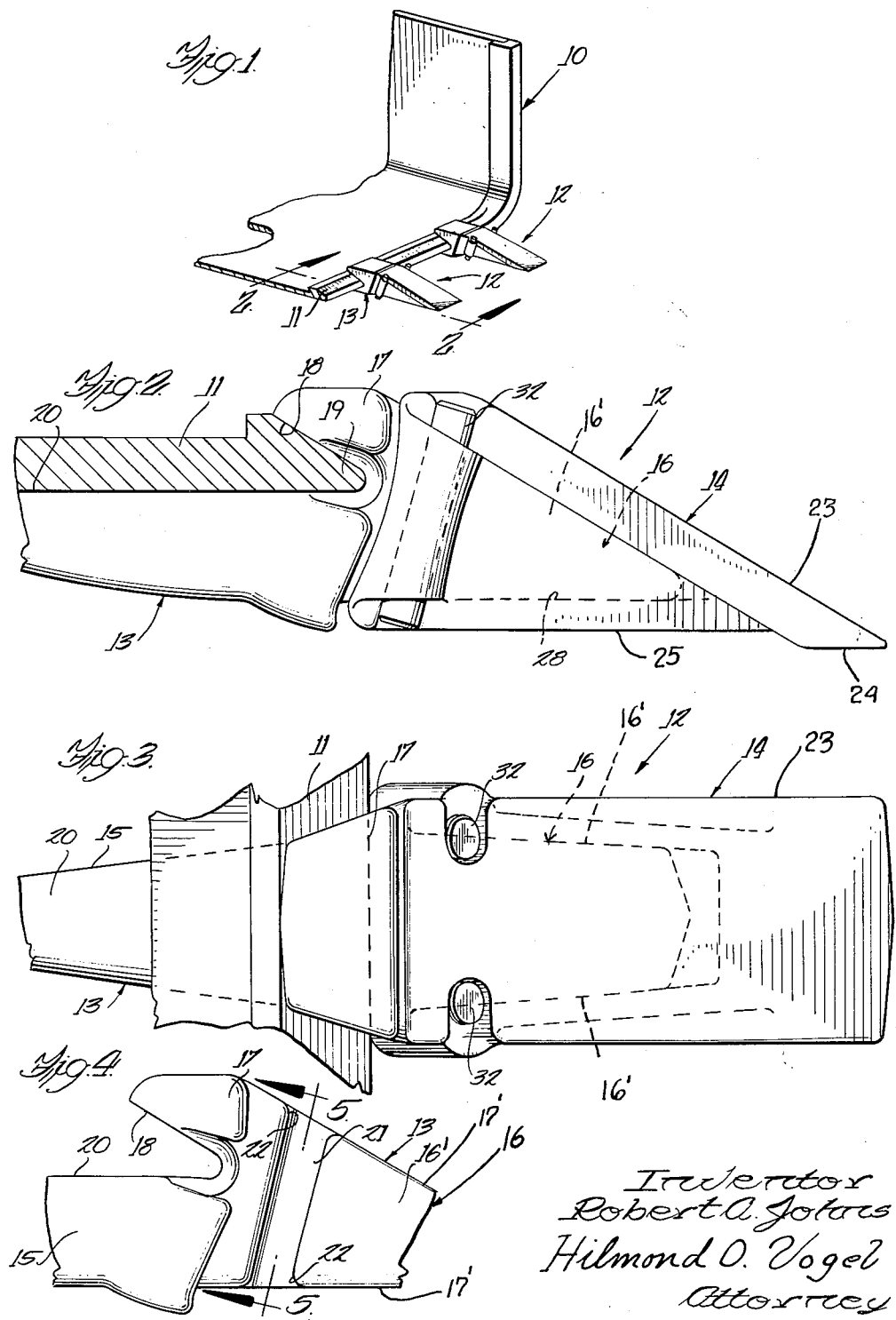

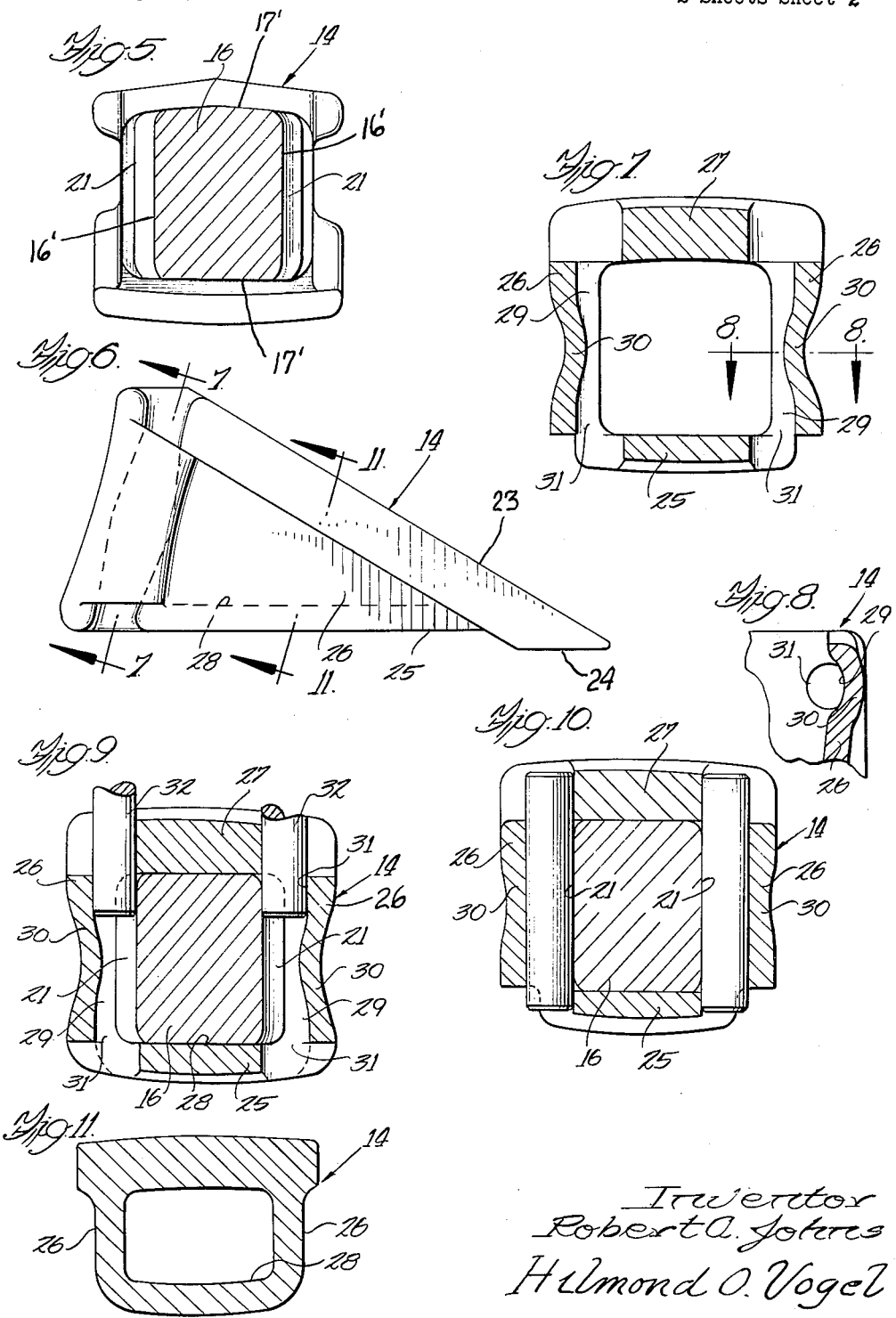

3,021,627
DIGGER TEETH FOR EXCAVATORS
AND THE LIKE
Robert A. Johns, Racine, Wis., assignor to Belle City
Malleable Iron Company, a corporation of Wisconsin
Filed July 25, 1961, Ser. No. 126,588
10 Claims. (Cl. 37—142)

This invention relates to digger teeth of a type generally used in excavating and ground digging machines. More specifically it relates to an improvement in replaceable and removable digger teeth.

This invention has for its prime object an improvement in connecting a replaceable and removable tooth to the shank of a digger tooth structure.

Another object is the provision of a positive and simplified means for connecting a replaceable digger tooth portion to a tooth shank, said means positively connecting the elements in assembly but being readily removable whereby the digger tooth may be replaced as desired.

A still further object is to provide an improved means for connecting a replaceable digger tooth to a tooth shank, the tooth and shank each having recessed portions disposed to provide keyways which receive keys in driven relation, the said tooth having wall portions disposed to normally constrict the keyways prior to the insertion of the keys and whereupon insertion of the keys said wall portions are displaced and exert a strong locking force on the keys to hold them in assembly within the keyways.

A still further object is to provide an improved means for connecting a digger tooth to a tooth shank the said means comprising keyways formed by the tooth and shank and being constructed to place locking keys in compression so as to exert an efficient locking force between the keys and the keyways to retain them in assembly while still permitting the ready removal of the keys in the event that it is necessary to replace the teeth.

Still another object is to provide an improvement in connecting a replaceable tooth to a shank so that it will not unintentionally come apart, the connection including a pin having a large shear area which with a recess in the shank solidly connects the shank and tooth.

These and other objects will become more readily apparent from a reading of the description when examined in connection with the accompanying sheets of drawings.

In the drawings:

FIGURE 1 is a partial view, in perspective, of an excavating bucket having several digger teeth embodying the invention connected thereto;

FIGURE 2 is an enlarged cross sectional view taken substantially along the line 2—2 of FIGURE 1;

FIGURE 3 is a plan view of the digger tooth structure shown in FIGURE 2;

FIGURE 4 is a fragmentary enlarged side elevational view of a tooth shank;

FIGURE 5 is a cross sectional view taken along the line 5—5 of FIGURE 4;

FIGURE 6 is a side elevational view of a replaceable or removable digger tooth;

FIGURE 7 is a cross sectional view taken along the lines 7—7 of FIGURE 6;

FIGURE 8 is a fragmentary view taken substantially along the line 8—8 of FIGURE 7;

FIGURE 9 is a cross sectional view, similar to FIGURE 7, showing however, partial stages in the assembly of a digger tooth to a tooth shank;

FIGURE 10 is a cross sectional view similar to FIGURE 9 showing the assembled condition of a replaceable tooth to its tooth shank; and FIGURE 11 is a cross sectional view taken along the lines 11—11 of FIGURE 6.

In FIGURE 1 a ground digging bucket or excavating bucket is generally referred to by the reference character 10. The ground digging bucket 10 comprises a leading edge 11 to which a plurality of ground digging or excavating teeth 12 are connected. The teeth 12 may, of course, be utilized in connection with other digging elements than excavating buckets the same merely being shown for illustrative purposes.

The ground digging tooth 12 comprises a tooth supporting base, or as is commonly known in the industry, an adaptor 13. A replaceable tooth for the said base 13 is indicated at 14. The base or adaptor 13 includes a rearwardly extending connecting portion 15, and a wedge or triangularly-shaped shank 16 which projects forwardly of the base 13. The base 13 also includes an upper ledge 17 adapted to provide a recess or pocket 18 which serves to accommodate the end 19 of the leading edge 11 of the bucket 10. The base 13 also includes an upper flat surface 20 which is flush against the underneath side of the bucket 10 in the assembled condition shown in FIGURE 1. As best shown in FIGURES 3 and 4 the base 13 is provided with opposed sides 16', a side 17' and an opposed side 17' the former being the upper side, and the latter being the lower side. The sides 16' include semi-cylindrical recesses 21 extending transversely with respect to said sides 16'. The recesses 21 are beveled and open at their upper and lower edges as indicated at 22.

Referring now particularly to FIGURES 6, 7 and 8, the replaceable tooth 14 is provided with an upper substantially wide flat wall 23 having at its forward end a cutting edge 24. The tooth 14 is also provided with a lower wall 25 and opposed sidewalls 26. As best shown in FIGURE 7 the lower wall 25 is narrow at its rearmost end and the upper flat wall 25 also includes a rear narrow portion indicated at 27. The walls 23, 25 and 26 are disposed to provide a socket indicated at 28. As best shown in FIGURE 2 the socket 28 receives the wedge-shaped shank 15 in interfitting relation.

The walls 26 are provided with inwardly extending open semi-cylindrical recesses 29 also open at their upper and lower ends. The recesses 29, and the recesses 21, in the assembled condition of the tooth 14 with the tooth base 13, form complete openings, bores or keyways open at their upper and lower ends as indicated at 31. The walls 26 at their rearmost end include portions indicated at 30 which are bowed or bent inwardly in arcuate configuration, during the unassembled condition of the tooth 14, to provide a constriction or restriction with respect to each of the keyways. This is particularly well shown in FIGURE 9. Cylindrical pins or keys are indicated at 32 and these keys 32 are of a drive-fit diameter relative to the keyways provided by the recesses 21 and 29.

In assembly, the tooth 14 is placed in interfitting engagement with the tooth shank or adaptor 13 as best shown in FIGURES 2 and 9. The keys 32 are then driven into the bores provided by the recesses 21 and 29. The bowed portions 30, of course, restrict the passage of the pins 32 but upon driving of the pins 32 further these bowed portions 30 flex outwardly sufficiently to permit the keys 32 to be driven into position as shown in FIGURE 10. The tooth 12 may be constructed of cast iron or steel material and the portions 30 are sufficiently thin so as to be flexible and yet sturdy and sufficiently strong to place the keys 32 in compression substantially along their length so as to tightly lock the said keys 32 in position within the keyways. Thus the keys are prevented from being displaced during the rugged operation to which teeth of this type are generally subjected. The keys are, if desired, permanently locked in position and yet, if desired, they may be removed by driving them from the keyways. Thus it is simple matter to replace the digger tooth if desired and yet there is little possibility of the tooth being inadvertently disassembled during ground digging operations.

While a cylindrical recess has been shown it is, of course, obvious that a rectangular, triangular, or other shaped bore or keyway may be utilized with complementally shaped keys without departing from the spirit of the invention as disclosed.

Thus the objects of the invention have been fully achieved in that an improved locking means has been disclosed for positively securing a replaceable tooth to a tooth shank.

What is claimed is:

1. A tooth structure comprising a base member, said base member including a forwardly projecting wedge shaped shank, said shank including first opposed sides and second opposed sides, said first sides each having a transversely extending first semi-cylindrical recess open at opposite ends thereof, said first recesses being substantially parallel and being in lateral alignment, a removable tooth, having a forwardly disposed cutting edge, said tooth having first opposed walls and second opposed walls providing a socket complemental to and receiving said shank in inter-engaging relation, said first of said opposed walls being provided adjacent their rearward ends with opposed wall portions having second semi-cylindrical recesses opening outwardly of said second opposed walls and forming with said first recesses at least two open end bores, said wall portions of said tooth having sections bowed inwardly into said bores to provide a constriction therein, and releasable locking means for connecting said tooth to said shank comprising a cylindrical pin extending through each bore, said sections of said wall portions being flexible to yield during assembly of said pins with said bores and exert a locking pressure on said pins.

2. A tooth structure comprising a base member, said base member including a forwardly projecting wedge shaped shank, said shank including first opposed sides and second opposed sides, said first sides each having a tranversely extending first semi-cylindrical recess open at opposite ends thereof, said first recesses being substantially parallel and being in lateral alignment, a removable tooth, said tooth having first opposed walls and second opposed walls providing a socket complemental to and receiving said shank in inter-engaging relation, said first of said opposed walls including opposed wall portions having second semi-cylindrical recesses opening outwardly of said second opposed walls and forming with said first recesses at least two open end bores, said wall portions of said tooth having sections bowed inwardly into said bores to provide a constriction therein, and releasable locking means for connecting said tooth to said shank comprising a cylindrical pin extending through each bore, said sections of said wall portions being flexible to yield during assembly of said pins with said bores and exert a locking pressure on said pins.

3. A tooth structure comprising a base member, said base member including a forwardly projecting wedge shaped shank, said shank including first opposed sides and second opposed sides, said first sides each having a transversely extending first semi-cylindrical recess open at opposite ends thereof, said first recesses being substantially parallel and being in lateral alignment, a removable tooth, said tooth having first opposed walls and second opposed walls providing a socket complemental to and receiving said shank in interengaging relation, said first of said opposed walls including opposed wall portions having second semi-cylindrical recesses opening outwardly of said second opposed walls and forming with said first recesses at least two open end bores, said wall portions of said tooth having sections curved inwardly into said bores to provide a constriction therein, and releasable locking means for connecting said tooth to said shank comprising a cylindrical pin extending through each bore, said sections of said wall portions being displaceable outwardly to yield during assembly of said pins with said bores and to exert a locking pressure on said pins.

4. A tooth structure comprising a base member, said bore member including a forwardly projecting wedge shaped shank, said shank including first opposed sides and second opposed sides, said first sides each having a transversely extending first semi-cylindrical recess open at opposite ends thereof, a removable tooth, said tooth having first opposed walls and second opposed walls providing a socket complemental to and receiving said shank in interengaging relation, said first of said opposed walls including opposed wall portions having second semi-cylindrical recesses opening outwardly of said second opposed walls and forming with said first recesses at least two open end bores, said wall portions of said tooth having sections bowed inwardly into said bores to provide a constriction therein, and releasable locking means for connecting said tooth to said shank comprising a cylindrical pin extending through each bore, said sections of said wall portions being flexible to yield during assembly of said pins with said bores and exert a locking pressure on said pins.

5. A tooth structure comprising a base member, said base member including a forwardly projecting shank, said shank having a pair of first semi-cylindrical recesses open at opposite ends, a removable tooth having inner walls providing a socket receiving said shank in interfitting relation, said inner walls including a pair of second semi-cylindrical recesses open at opposite ends and providing with said first recesses open-end keyways, said inner walls including sections bowed inwardly into said keyways during the unassembled condition of said tooth, and cylindrical key members disposed in said keyways, said sections being flexible to yield to said keys and exerting a locking pressure on said keys to retain said keys in said keyways and said tooth on said shank.

6. A tooth structure comprising a base member, said base member including a forwardly projecting shank, said shank having a pair of first recesses; a removable tooth having inner walls providing a socket receiving said shank in interfitting relation, said inner walls including a pair of second recesses providing with said first recesses open-end keyways, said inner walls including sections bowed inwardly into said keyways during the unassembled condition of said tooth, and key members disposed in said keyways, said sections being flexible to yield to said keys and exerting a locking pressure on said keys to retain said keys in said keyways and said tooth on said shank.

7. A tooth structure comprising a base member, said base member including a projecting shank, said shank having a pair of first recesses; a removable tooth having inner walls providing a socket receiving said shank in interfitting relation, said inner walls including a pair of second recesses providing with said first recesses keyways, said inner walls including sections bowed inwardly into said keyways during the unassembled condition of said tooth, and key members disposed in said keyways, said sections being flexible to yield to said keys and exerting a locking pressure on said keys to retain said keys in said keyways and said tooth on said shank.

8. A tooth structure comprising a base member, said base member including a forwardly projecting shank, said shank having a pair of first recesses; a removable tooth having inner walls providing a socket receiving said shank in interfitting relation, said inner walls including a pair of second semi-cylindrical recesses open at opposite ends and providing with said first recesses open-end keyways, said inner walls including sections projecting inwardly into said keyways during the unassembled condition of said tooth, and cylindrical key members disposed in said keyways, said projecting sections being flexible to yield to said keys and exerting a locking pressure on said keys to retain said keys in said keyways and said tooth on said shank.

9. A tooth structure comprising a base member, said base member including a shank, said shank having a surface and a first recess extending transversely with respect to said surface, a removable tooth having inner walls providing a socket receiving said shank in interfitting relation, one of said walls including a second recess positioned with respect to said first mentioned recess to provide an elongated opening, opening outwardly of said structure, said wall including said recess having a portion thereof bowed inwardly into said opening to partially constrict the same, and a key tightly driven into said opening, said wall portion including said first recess being flexible to accommodate said key and to exert a locking pressure thereon.

10. A tooth structure comprising a base member, said base member including a shank, said shank having a surface and a first recess extending transversely with respect to said surface, a removable tooth having inner walls providing a socket receiving said shank in interfitting relation, one of said walls including a second recess positioned with respect to said first mentioned recess to provide an elongated opening, said wall including said recess having a portion thereof disposed inwardly into said opening to partially constrict the same, and a key tightly driven into said opening, said wall portion including said first recess being flexible to accommodate said key and to exert a locking pressure thereon.

References Cited in the file of this patent

UNITED STATES PATENTS

| | | |
|---|---|---|
| 1,527,189 | Honstain | Feb. 24, 1925 |
| 1,815,819 | Andersen | July 21, 1931 |
| 1,951,988 | Mekeel | Mar. 20, 1934 |